March 23, 1926.
J. F. FOSTER
ROLLER BEARING
Filed Oct. 8, 1923
1,577,705
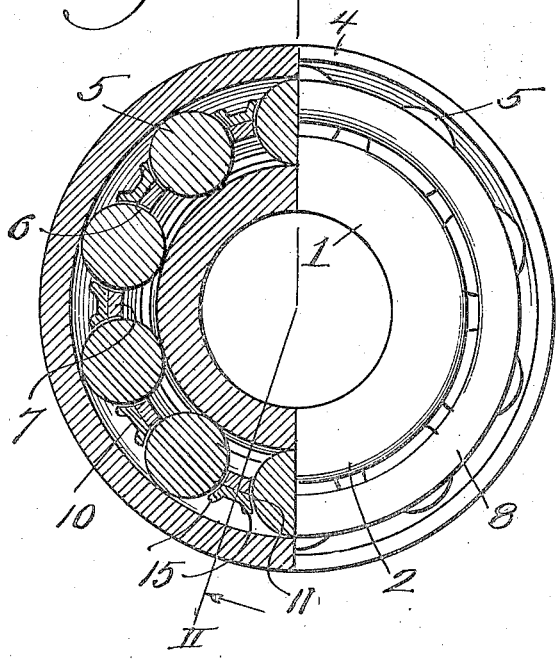
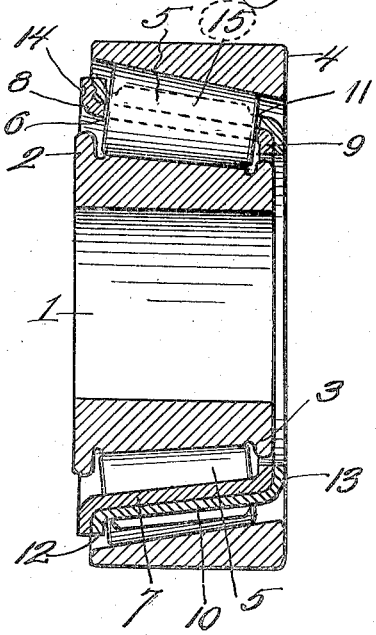
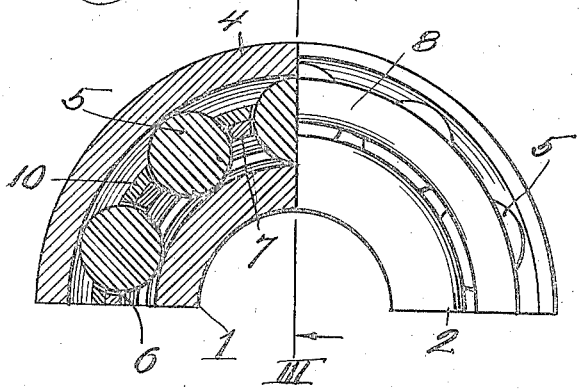
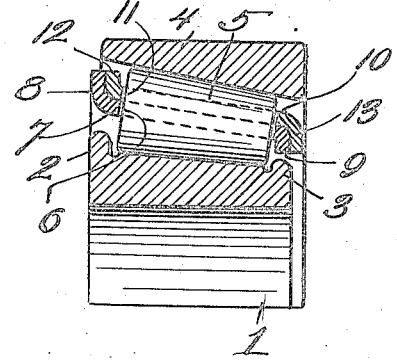
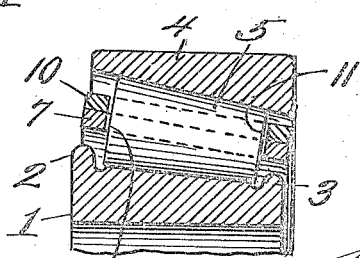
Inventor,
John F. Foster.

Patented Mar. 23, 1926.

1,577,705

UNITED STATES PATENT OFFICE.

JOHN F. FOSTER, OF FORT MADISON, IOWA.

ROLLER BEARING.

Application filed October 8, 1923. Serial No. 667,195.

*To all whom it may concern:*

Be it known that I, JOHN F. FOSTER, a citizen of the United States, and resident of Fort Madison, county of Lee, State of Iowa, have invented a certain new and useful Improvement in Roller Bearings, of which the following is a complete specification.

This invention relates to roller bearings of the three-assembly type, that is of that class where the removal of the cone member of the assembly from operative relation with the cage and roller members results in the dislocation of the rollers from the cage, as distinguished from the two-assembly type in which the cage is adapted to support the rollers in operative relation to each other, and my object is to produce a three-assembly roller bearing of simple, strong, durable and efficient character.

To this end the invention consists in certain novel and useful features of construction and combinations of parts as hereinafter described and claimed, and in order that it may be fully understood, reference is to be had to the accompanying drawing, in which:—

Figure 1 is a view partly in side elevation and partly in section of a roller bearing embodying the invention;

Figure 2 is a section on the line II—II of Figure 1;

Figure 3 is a fragmental view of the same character as that shown by Figure 1, but showing a slightly modified form of construction;

Figure 4 is a radial section taken on the line III—III of Figure 3;

Figure 5 is a view corresponding to Figure 4, but of a slightly modified construction.

In the said drawing 1 indicates the inner cone of the bearing, the same being provided at its larger or base end with a peripheral flange or bead 2, and at its opposite end with a similar bead or flange 3, and surrounding said cone concentrically is the collar 4, the inner wall of said collar being tapering and converging with respect to the outer surface of the cone 1.

The cone 1 and the collar 4 constitute a trackway for the circular series of rollers 5, the said rollers being of length to engage the cone between its said flanges 2 and 3. The rollers fit centrally in openings provided in the inner shell or member 7 of the cage, which member in the preferred construction is provided at its base end with an outwardly projecting flange 8, and at its opposite end with an inwardly projecting flange 9.

The outer member or shell 10 of the cage is nested upon the inner member or shell, and is provided with openings 11 registering with openings 6 but of slightly less width so as to snugly receive the rollers slightly outward of their centers, the width of the openings 11 making it impossible for the rollers to be forced outwardly beyond a predetermined position with respect to the cage. The outer shell or member of the cage is provided at its base end with an outwardly projecting flange 12 fitting against flange 8 of the inner member, and at its opposite end with an inwardly projecting flange 13 fitting against the corresponding flange of the inner member, and to secure the said cage members in rigid relation to each other, they may be indented by punching as at 14.

In the preferred construction, the outer cage member is preferably provided at the side margins of its openings 11 with outwardly projecting flanges 15, this construction being especially desirable where said outer member is of relatively thin metal. If of relatively thick metal, as indicated in Figures 3 to 5, inclusive, the said wings or flanges 15 may be dispensed with. Where the cage members are of relatively heavy material, the stiffening flanges 8, 9, 12 and 13 may also be omitted, as indicated in Figure 5.

In assembling the structure, the rollers constituting one member of the assembly, are fitted in the openings of the cage which constitute the second member of the assembly, and then the cage and rollers are slipped onto the inner cone over the flange or bead 3 thereof, there being sufficient spring or play to permit the rollers to be so disposed although not enough for the cage and rollers to slide outwardly accidentally over said flange. The three-piece assembly is then fitted in operative relation to the collar 4 and the structure is ready and in condition for operation as a bearing.

From the above description it will be apparent that I have produced a roller bearing embodying the features of construction set forth as desirable in the statement of the object of the invention, and which may be modified in minor particulars without departing from the principle of construction and mode of operation involved.

I claim:

1. A roller bearing, comprising outer and inner bearing members, an outer shell between said bearing members, an inner shell within said outer shell, said inner and outer shells being formed with a series of openings, a series of rollers mounted in said openings, the openings in said inner shell being of width substantially equal to the diameters of the rollers, and the openings in the outer shell being provided with flanges for preventing the ejectment of the rollers from their respective openings in the inner shell and to support said inner shell with the medial line of the opposite edges of each of its openings in substantially the circular plane of the axes of the rollers.

2. A roller bearing comprising outer and inner bearing members, an outer shell between said bearing members, an inner shell within said outer shell, said inner and outer shells being formed with a series of registering openings, a series of rollers mounted in said openings, the openings in one of said shell members being of width substantially equal to the diameters of the rollers, and the openings in the other shell member being of less width than the diameters of the rollers and bearing such a relation to said rollers as to support its companion shell with the medial line of the opposite edges of each of its openings in substantially a plane passing through the axis of the respective roller.

3. A roller bearing comprising outer and inner bearing members, an outer shell between said bearing members, an inner shell within said outer shell, said outer and inner shells being formed with a series of registering openings, a roller mounted in each of said openings, the openings in the outer and inner shells respectively being less and equal in width to the diameters of the rollers, the relation of the opening in the outer shell to the roller being such as to maintain the medial line of the opposite edges of the inner openings in substantially a plane passing through the axis of the roller.

In witness whereof I hereunto affix my signature.

JOHN F. FOSTER.